United States Patent
Eberhart

[15] 3,695,149
[45] Oct. 3, 1972

[54] SEAL FOR RAM

[72] Inventor: Walter W. Eberhart, 645 Arbor Lane, Glenview, Ill. 60025

[22] Filed: Oct. 23, 1970

[21] Appl. No.: 83,341

[52] U.S. Cl. ..........................92/168, 92/170, 92/248
[51] Int. Cl. ............F16j 1/02, F16j 7/00, F16j 11/04
[58] Field of Search........92/165, 168, 170, 223, 248, 92/249; 308/DIG. 7, 4 R; 277/153, 165, 142

[56] References Cited

UNITED STATES PATENTS

| | | | |
|---|---|---|---|
| 2,042,078 | 5/1936 | Suhm et al. | 92/168 X |
| 2,817,562 | 12/1957 | Fleming et al. | 92/223 X |
| 2,846,943 | 8/1958 | Belk | 92/249 X |
| 3,040,712 | 6/1962 | Harrah | 92/248 X |
| 3,072,413 | 1/1963 | Parks | 277/153 X |
| 3,181,560 | 5/1965 | Worden et al. | 92/223 X |
| 3,398,652 | 8/1968 | Miller | 308/4 X |
| 3,547,008 | 12/1970 | Connor | 92/170 |

*Primary Examiner*—Edgar W. Geoghegan
*Assistant Examiner*—Irwin C. Cohen
*Attorney*—Harbaugh & Thomas

[57] ABSTRACT

Bearings for the support of reciprocating members for operation under adverse conditions are disclosed having fluorocarbon-plastic interfaces that are capable of withstanding high fluid pressures and temperatures. The bearings are self-healing in the event of a scratch or scoring at the interface. In one embodiment sleeve bearings for hydraulic rams are disclosed wherein the moving part has a thin coat of a fluorocarbon of high tensile strength and abrasion resistance and the other part comprises a plastic body or seal formed of a different plastic such as Buna N, or polyurethane and the like or comprises a plastic body or seal such as fiber glass impregnated with a fluorocarbon, graphite on canvas, Nylon, Delrin and the like. The thin coating of fluorocarbon is applied by spraying at a temperature of about 600° F and must be without subsequent sintering.

5 Claims, 3 Drawing Figures

PATENTED OCT 3 1972  3,695,149

INVENTOR:
WALTER W. EBERHART
By Harbaugh & Thomas
Attorneys

SEAL FOR RAM

BACKGROUND OF THE INVENTION

The low friction properties of the fluorocarbon polymers are well known. These materials are composed of homopolymers of tetra fluoroethylene (TFE) or copolymers of TFE and other fluorinated monomers, such as hexafluoropropylene (HFP) compounded with certain modifying agents. The coatings are applied by specialized techniques. Recently several methods have been developed for bonding less expensive, non-woven sheets or thick coatings of a fluorocarbon such as the proprietary products known as Teflon and KEL-F and other fluorocarbons, as examples, directly to other materials such as metal to provide a protective corrosion-resistant coating. Seals for cyrogenic space systems, cyclone hoppers, molds, wire conveyor belts, circuit breakers, slides for freezer drawers, valve balls, filters, fans, snow shovels and a host of other products have been fabricated with fluorocarbon coatings. Some of the methods used are described in U.S. Pat. Nos., Welch 2,777,783; Smith 2,774,704; Punagrossi 2,705,691; Adinoff 3,502,380 and Williams 3,011,219. Layers of bondable carrier material containing increasing quantities of the fluorocarbon known as Teflon in the form of a dispersion are coated and baked on the surface of a ball with the final coating containing about 90° or more of the fluorocarbon. The fluorocarbon of each layer is said to fuse together and is interlocked and physically retained by the carrier material which will bond to the metal of the ball. A suitable backing element or cup is then molded thereabout and retained by a housing to provide a ball joint with a bearing surface between the fluorocarbon and the backing element.

Coatings of this type re difficult to form into a true surface and deviations are alleged to be detrimental to the final result. This problem is overcome by applying the fluorocarbon directly to the surface of the ball by spraying, brushing, dipping and any suitable means, followed by sintering at temperatures of 750° F or more to form a solid coating that accurately conforms to the surface of the metal part and is mechanically retained thereon because of the spherical shape of the ball. The method of Williams is also applied to reciprocating rods. After forming the coating of fluorocarbon, the bond between the metal and polymer is broken to form a metal-to-plastic bearing surface of high accuracy.

The prior art ball joints and bearings for reciprocating shafts generally provide a metal-plastic bearing interface or in those instances where a plastic to plastic interface is contemplated, the dimensional tolerances between the parts are very critical because of the sintering. The plastic sleeves used about the shafts must be formed by injection molding or extrusion. The wall thicknesses must be such that the tolerance of the external diameter of the shaft and the internal diameter of the sleeve is very small to provide an interference fit in order to insure that the sleeve will remain fixed relative to the shaft.

SUMMARY OF THE INVENTION

In the present invention the plastic bearing surface or seating surface on the shaft to be rotated or reciprocated is applied as a thin spray coating which eliminates the necessity of maintaining close tolerances in molding and extrusion. A number of unexpected advantages accrue as a result. The coating provides protection of the shaft from the environment, especially when it reciprocates and travels a portion of its length from the seal support. The coating is able to withstand adverse conditions, dirt, high temperatures and high pressures in addition to eccentric thrust on the shaft and seals caused by extreme loads. In applications of hydraulic or pneumatic single acting or displacement type cylinders requiring low pressure or gravity return, the invention eliminates the "slip stick" of the normal gravity return cylinder. In hydraulic lifting devices the use of the instant bearing-seal combination eliminates external weepage of fluid due to microscopic films of hydraulic fluid in the rod surface and leaking is eliminated. In hydraulic or pneumatic lifting devices employing scissors lifts or pusher devices undergoing extreme eccentric thrust on cylinder rods, plungers or rams, undesirable wear, leakage, binding and scoring are eliminated from the moving parts.

In accordance with this invention the prior art difficulties are eliminated by bringing together the lubricity and hardness of an unsintered fluorocarbon coating and the greater hardness of a second plastic as the sliding contact interface and prolonged life, increased efficiency and economies in construction are experienced. Thus, the life and efficiency of hydraulic lift rams and gravity return devices are increased and economies obtained as the result of the judicious use of inexpensive plastic materials in place of chrome plating and like expedients used in the prior art.

DESCRIPTION OF THE DRAWINGS

Illustrative embodiments of the invention are shown in the drawings wherein.

DESCRIPTION OF PREFERRED EMBODIMENTS

Figure 1:
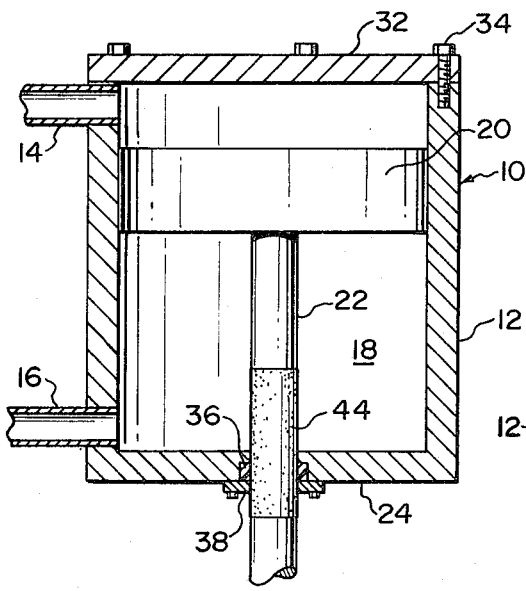
FIG. 1 is a fragmentary partial cross-sectional view of a hydraulic ram having a coated cylinder and piston along with a coated rod and bearing support fabricated in accordance with this invention.

Referring to the drawings the invention is illustrated by two embodiments, namely, the interface between a reciprocating piston and cylinder wall and also by a reciprocating piston rod. It is understood that other of these embodiments may be used singly or they may be used together in a pressure-operated apparatus.

In FIG. 1 the hydraulic ram 10 is provided with the usual form of cylindrical housing 12 having the inlet and outlet conduits 14 and 16 for the introduction of hydraulic fluid or compressed air and the like into the chamber 18 on either side of the piston 20 for the purpose of moving or reciprocating the piston therein. The piston 20 is affixed to the piston rod 22 which passes through the bottom wall 24 of the housing and is affixed to a part (not shown) to be moved or upon which force is to be applied. The sub-assembly shown in the drawings can be used in any desired attitude.

As one embodiment of the invention, the moving part, in this instance the piston (FIG. 2) is spray-coated with a thin, unsintered layer 26, on the top, and a thin unsintered layer 28, on the sides or periphery, both layers comprising a fluorocarbon exhibiting a tensile strength of 3,000 psi (ASTM method DG 38) or more and having a high lubricity. The inside wall of the housing 12 is provided with a sleeve or coating 30 of a different plastic such as Buna N. polyurethane, Nylon or Delrin and the like. The sleeve 30 is co-extensive with the path of travel of the piston 20 in the chamber 18 along the sides thereof. The cylinder or housing 12 is enclosed at the top with a cylinder head 32 which may or may not also receive a coating 30, primarialy for protection against corrosion. The head 32 is affixed to the housing by suitable bolts 34.

Figure 3:
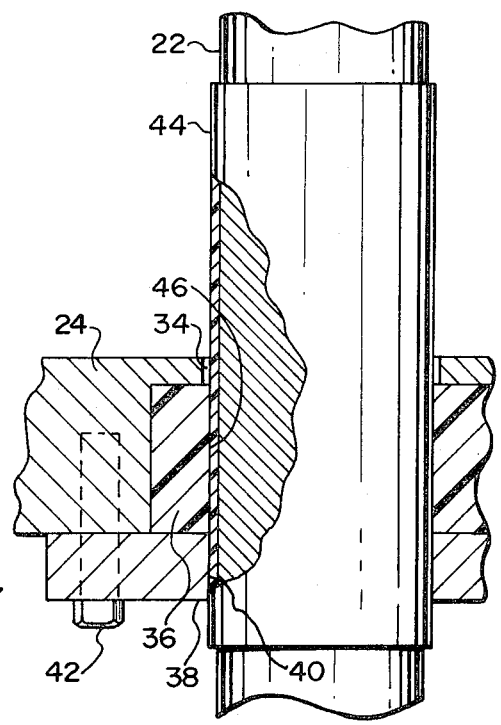
FIG. 3 is a fragmentary enlarged cross-sectional view like FIG. 1 showing the piston rod and seal in greater detail.

Referring to FIGS. 1 and 3 the piston rod 22 is shown extending through the bore hole 34 in the bottom wall 24 in spaced relationship and also in guided relationship through the plastic bearing or sleeve 36 held in place by the seal plate 38 having a bore 40, axially aligned with the bore 34. The plate 38 is held in place by the bolts 42 or any suitable attaching means, which engage therethrough into the bottom wall 24. Both the bores 34 and 40 are in spaced relationship from the body of the shaft, although the spacial interface of the bore 40 may be considerably smaller than the former. In any event a clearance at the bore 40 is provided.

Figure 2:
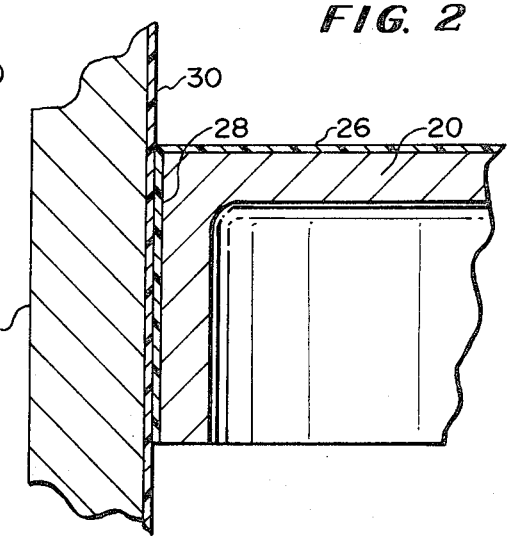
FIG. 2 is a fragmentary enlarged cross-section view like FIG. 1 showing a cylinder wall and piston wall in greater detail.

That portion of the rod 22 which passes or reciprocates through the end wall 24 is provided with the spray coating 44 of a fluorocarbon like that used in the coating 28 (FIG. 2). The thickness of the coating is exaggerated in FIG. 3 for purposes of illustration. The sleeve or bushing 36 is comprised of one of the aforesaid different plastic compositions as used in the sleeve 30 (FIG. 2). The sleeve 44 and the seal 36 reciprocate at the interface 46 and are adapted to withstand severe conditions of pressure, temperature and loading.

The coatings 26, 28 and 44 are composed of the proprietary product of E.I. DuPont de Nemours & Co. (Inc.) known as TEFLON-S, same being a registered trademark. This product exhibits the following typical properties.

TABLE I

| Property | TEFLON-S Value | ASTM Method |
|---|---|---|
| tensil strength at 77°F (psi) | 3000–6000 | D 638 |
| elongation at 77°F (%) | 3–10 | D 638 |
| adhesion to metal | excellent | — |
| water absorption (%) | less than 2 | D 570 |
| use temperatures | 50°–500°F | — |
| hardness (in Knoop hardness units using Bell abrasion tester) | 9–13 | — |
| hardness (Sward rocker test) | 46–62 | — |

The coatings comprise primarily polytetrafluoroethylene (TFE) a homopolymer containing TFE monomer units exclusively. In order to provide optimum results with the coated rod, the rod is cleaned and polytetrafluoroethylene is applied as a very thin coating and most conveniently by spraying. The coated part is then dried, preferably to a temperature up to about 600° F but below the sintering temperature which is 750° F or above. This forms a semi-hard but low friction surface which has the ability to heal when scored under adverse conditions. Water immersion after coating, as is sometimes used in the art, is unnecessary and may be deleterious to the healing property. If desired several coats of polytetrafluoroethylene may be applied to form the surfaces 26, 28 and 44, using in each instance the drying step maintained at the prescribed temperatures. Also a prime coat of poly TFE can be used which is dried at a temperature below about 200° F and then baked at temperatures in excess of 750° F until sintered. Following the prime coat the final or outer coat or coatings of poly TFE are applied as previously described in a manner to preserve the lubricity and healing properties.

The proprietary product known as DuPont Teflon Primer 850–201 can be used as a very thin (in the order of 0.002 to 0.003 inch) prime coating. Subsequent baked layers of the product known as TEFLON-S are added to bring the thickness to 0.003 to 0.005 inch. A fine mist of these products is directed upon the piston and rod surface involved to obtain an even distribution of the particles. Pressures of 60 to 150 psi or higher are used in the spraying. Water dispersions of the poly TFE can be used for this purpose. The water evaporates rapidly and a thin layer or film of poly TFE remains. Drying is carried out in carefully controlled ovens with care being taken not to overheat or heat unevenly to prevent sintering and blistering. Dipping is not a satisfactory coating method because of the problem of bubbles.

The sleeve 30 and the seal 36 are formed of a different plastic characterized by its hardness, good heat resistance, such as epoxy, resins, acetals, polyurethanes, polystyrene, Nylon, fiberglass, phenolics, phenolformaldehyde resins (glass filed) and polycarbonates. The preferred plastic is Delrin, (a proprietary product of E.I. DuPont de Nemours and Co. Inc.) which is an acetal homopolymer made by the polymerization of formaldehyde and is characterized by its high strength and rigidity, excellent dimensional stability, etc. This material is resistant to extreme temperatures without deflection under pressure. The proprietary products known as Zytel, by the same manufacturer have excellent resistance to heat up to 470° F. These materials whether thermosetting, or thermoplastic nature are cast or molded using known techniques to form the sleeves and seals used in accordance with this invention.

In the actual practice of this invention, a ram such as shown in the drawings was fabricated. The sleeve bearing 36 was formed by injection molding and machining to a perfect fit using the acetal resin known as DELRIN. A spray coating 44 of the fluorocarbon known as TEFLON-S was applied to the rod portion of the ram. This coating was oven dried at a maximum temperature of 600° F for 6 hours. After preparation of the parts the ram was assembled and used in a lifting machine for a period of 6 months. During the cycles of operation, the hydraulic pressures rose to 4,000 spi and thrust loads of several tons, with as much as 30 to 40 percent of the load off-balance, were applied. The machine was operated in extremely dusty conditions. After 6 months of almost continuous operation the ram was dis-assembled and the parts inspected. No signs of wear of the sleeve or coating were detected and no leaks developed in the assembly. The average operating temperatures of this assembly exceeded 200° F.

The products known as Delrin AF fiber/resin containing Teflon fibers and the products known as Delrin 570X containing glass fibers are used to fabricate the sleeve 36 as another example. Outstanding anti-frictional and wear properties are exhibited with the TEFLON-S coating. This combination is useful for the hydraulic lifts and extensible members used on farm machinery, trucks and road machinery where extremes of dust, moisture, vibration and thrust are encountered. In still another example the sleeve 46 is molded by using the proprietary product known as Zytel to form a sleeve that exhibits extended life at elevated temperatures.

What is claimed is:

1. A hydraulically operated power member comprising:
    a cylindrical housing having an internal sleeve composed of a plastic material characterized by its hardness and heat resistivity;
    a piston adapted to reciprocate within said housing, said piston being coated with a fluorocarbon dried below the sintering temperature;
    a piston rod affixed to said piston and extending axially from said housing at an end wall thereof, said rod being coated with a fluorocarbon dried below the sintering temperature; and
    a support member within the end wall of said housing encompassing said piston rod in pressure sealed relationship and comprising a plastic material characterized by its hardness and heat resistivity;
    said coating of fluorocarbon on said rod being co-extensive with the length of reciprocation of said rod and said sleeve being co-extensive with the length of reciprocation of said piston whereby frictionless bearing interfaces are maintained during operation.

2. A hydraulically operated power member in accordance with claim 1 in which said coatings comprises a homopolymer of tetrafluoroethylene having a tensile strength of 770° F of at least about 3,000 psi and a hardness of about 9–13 Knoop hardness units and said support member and sleeve comprise a plastic material selected from the group consisting of epoxy resins, acetal homopolymers, polyurethane, polyamide, polystyrene, phenolics, phenolformaldehyde resins and polycarbonates.

3. A hydraulically operated power member in accordance with claim 2 in which said support member comprises a seal of an acetal homopolymer.

4. A hydraulically operated power member in accordance with claim 2 in which:
    said support member comprises a polyamide seal.

5. In a hydraulically operated power member which includes a housing, a piston adapted to reciprocate within said housing in bearing relationship, a piston rod affixed to said piston and extending axially from said housing at an end wall thereof and a support member within the end wall of said housing encompassing said piston rod in pressure sealed bearing relationship; the combination of at least one coextensive bearing interface between said reciprocating parts comprising a first bearing surface of a plastic material characterized by its hardness and heat resistivity selected from the group consisting of epoxy resins, acetal homopolymers, polyurethane, polyamide, polystyrene, phenolics, phenolformaldehyde resins and polycarbonates, and a second bearing surface, coating on said piston rod having a length equal to the stroke of said piston comprising a homopolymer of tetrafluorethylene dried below the sintering temperature and having a tensile strength at 770° F of at least about 3000 psi and a hardness of about 9–13 Knoop hardness units.

* * * * *